(12) United States Patent
Hsu

(10) Patent No.: US 10,688,596 B2
(45) Date of Patent: Jun. 23, 2020

(54) WIRE MANUFACTURED BY ADDITIVE MANUFACTURING METHODS

(71) Applicant: Illinois Tool Works Inc., Glenview, IL (US)

(72) Inventor: Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 21 days.

(21) Appl. No.: 15/373,230

(22) Filed: Dec. 8, 2016

(65) Prior Publication Data

US 2017/0173735 A1 Jun. 22, 2017

Related U.S. Application Data

(60) Provisional application No. 62/269,247, filed on Dec. 18, 2015.

(51) Int. Cl.
*B23K 35/40* (2006.01)
*B23K 26/34* (2014.01)
(Continued)

(52) U.S. Cl.
CPC ............ *B23K 26/342* (2015.10); *B21C 3/08* (2013.01); *B22F 3/1055* (2013.01); *B22F 5/12* (2013.01); *B23K 9/04* (2013.01); *B23K 9/167* (2013.01); *B23K 15/0026* (2013.01); *B23K 15/0086* (2013.01); *B23K 26/0624* (2015.10); *B23K 26/702* (2015.10); *B23K 35/02* (2013.01); *B23K 35/0222* (2013.01); *B23K 35/0227* (2013.01);
(Continued)

(58) Field of Classification Search
CPC . B23K 35/40; B23K 26/34–342; B22F 3/002; B22F 5/12
See application file for complete search history.

(56) References Cited

U.S. PATENT DOCUMENTS 5,038,014 A * 8/1991 Pratt .................... B22F 3/1055
219/121.64
5,182,430 A * 1/1993 Lagain .................. B05B 7/1404
118/641
(Continued)

FOREIGN PATENT DOCUMENTS

CN 1590009 A 3/2005
CN 101024263 A 8/2007
(Continued)

OTHER PUBLICATIONS

Notification of Transmittal of the International Search Report and the Written Opinion of the International Searching Authority, or the Declaration, in international application No. PCT/US2016/066268 dated Apr. 21, 2017 (15 pages).
(Continued)

*Primary Examiner* — Michael A Laflame, Jr.
(74) *Attorney, Agent, or Firm* — McAndrews, Held & Malloy, Ltd.

(57) ABSTRACT

Systems and methods for the manufacture of a solid wire using additive manufacturing techniques are disclosed. In one embodiment, a fine powdery material is sintered or melted or soldered or metallurgically bonded onto a metal strip substrate in a compacted solid form or a near-net shape (e.g., a near-net solid wire shape) before being turned into a final product through forming or drawing dies.

35 Claims, 9 Drawing Sheets

(51) Int. Cl.

| | | |
|---|---|---|
| *B22F 5/12* | (2006.01) | |
| *B23K 26/342* | (2014.01) | |
| *H05B 6/10* | (2006.01) | |
| *B23K 26/0622* | (2014.01) | |
| *B23K 26/70* | (2014.01) | |
| *B23K 15/00* | (2006.01) | |
| *B23K 9/04* | (2006.01) | |
| *B23K 9/167* | (2006.01) | |
| *B23K 35/02* | (2006.01) | |
| *B22F 3/105* | (2006.01) | |
| *B21C 3/08* | (2006.01) | |
| *B23K 35/36* | (2006.01) | |
| *C04B 35/622* | (2006.01) | |
| *B33Y 30/00* | (2015.01) | |
| *B33Y 80/00* | (2015.01) | |
| *B33Y 10/00* | (2015.01) | |
| *B23K 101/32* | (2006.01) | |

(52) U.S. Cl.
CPC ...... *B23K 35/0244* (2013.01); *B23K 35/0261* (2013.01); *B23K 35/36* (2013.01); *B23K 35/40* (2013.01); *B23K 35/404* (2013.01); *B23K 35/406* (2013.01); *C04B 35/62277* (2013.01); *H05B 6/10* (2013.01); *B22F 2003/1053* (2013.01); *B22F 2003/1056* (2013.01); *B23K 2101/32* (2018.08); *B33Y 10/00* (2014.12); *B33Y 30/00* (2014.12); *B33Y 80/00* (2014.12); *Y02P 10/295* (2015.11)

(56) References Cited

U.S. PATENT DOCUMENTS

| | | | | | |
|---|---|---|---|---|---|
| 5,837,960 | A  * | 11/1998 | Lewis | ............. | B23K 26/34 219/121.63 |
| 6,450,393 | B1 * | 9/2002 | Doumanidis | ......... | B23P 15/00 156/264 |
| 6,575,218 | B1 * | 6/2003 | Burns | ............. | B22F 3/005 156/248 |
| 7,402,219 | B2 * | 7/2008 | Graf | ............. | B22F 3/008 156/248 |
| 9,352,416 | B2 * | 5/2016 | Khare | ............. | B23K 26/0823 |
| 9,498,921 | B2 * | 11/2016 | Teulet | ............. | B22F 3/1055 |
| 9,656,344 | B2 * | 5/2017 | Kironn | ............. | B23K 20/103 |
| 2010/0034982 | A1 | 2/2010 | Fuwa | | |
| 2011/0024043 | A1 * | 2/2011 | Boock | ............. | A61B 5/14532 156/345.24 |
| 2013/0082036 | A1 | 4/2013 | Quintana | | |
| 2015/0021379 | A1 | 1/2015 | Albrecht | | |
| 2015/0209907 | A1 | 7/2015 | Narayanan | | |
| 2016/0368055 | A1 * | 12/2016 | Swaminathan | ....... | B22F 3/1055 |
| 2017/0120332 | A1 * | 5/2017 | DeMuth | ............. | B33Y 10/00 |
| 2017/0136578 | A1 * | 5/2017 | Yoshimura | ......... | B23K 26/342 |

FOREIGN PATENT DOCUMENTS

| | | |
|---|---|---|
| CN | 103958119 | 7/2014 |
| EP | 2 138 263 A2 | 12/2009 |
| EP | 2 460 608 A1 | 6/2012 |
| TW | 466733 | 12/2001 |
| WO | 01/91965 A1 | 12/2001 |

OTHER PUBLICATIONS

Notification Concerning Transmittal of International Preliminary Report on Patentability, in international application No. PCT/US2016/066268 dated Jun. 28, 2018 (11 pages).

Canadian Office Action Appln No. 3,005,367 dated May 8, 2019.
Taiwanese Search Report for Appln. No. 105141698 dated Apr. 12, 2020.

* cited by examiner

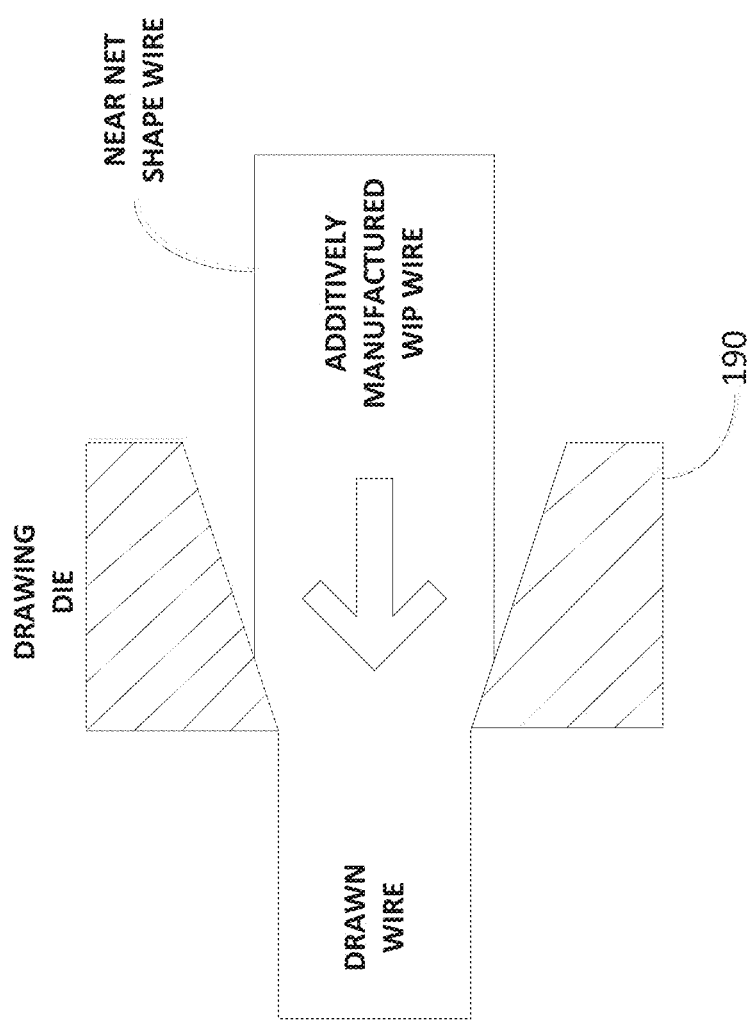

WIRE MANUFACTURED BY ADDITIVE MANUFACTURING METHODS

RELATED APPLICATIONS

The present application claims priority to and benefit from U.S. Application No. 62/269,247, filed Dec. 18, 2015. The above-identified application is hereby incorporated herein by reference in its entirety.

BACKGROUND

Solid wire and tubular wire co-exist in the marketplace since each type of wire has its own pros and cons.

Solid wire provides a cost advantage and a consistency and precision in diameter, core composition, deposition, helix, cast, wire placement, feedability, surface chemistry, arc characteristics, etc. However, solid wire costs are driven primarily by the green rod cost that is largely dependent on economies of scale, thereby making it difficult for manufacturers to produce custom solid wire in smaller lot sizes due to the sourcing barrier of steel billets raw material from steel mills.

Tubular wire, characterized by a conglomerated or blended powder in the core and a metal sheath surrounding the core, benefits from changing chemistry for smaller lot sizes. However, tubular wire is difficult to produce when the finished diameter is too small (e.g., 0.030" or less). Work hardening from folding the thin sheath may require annealing. For out of position welding, synergic pulse waveform may need to be developed for its increased melt-off rate and metal transfer behavior. It may have variation in powder density, homogeneity, compactness, and sheath thickness and may trap air and moisture inside the wire. Thus it may not be as consistent as solid wire in metal transfer and other welding characteristics. Reduced columnar strength may present wire feeding challenges. Seamless tubular wire overcomes some issues of the seamed tubular wire such as uniform outer surfaces for copper plating and being orientationally insensitive to deformation from drive roll pressure. However, seamless wire is more costly to produce due to batch filling and high frequency welding of the seam and also due to the batch annealing operations required to mitigate the work hardening effect. One issue characteristic of tubular wire is that there is a ballooning phenomenon in which the molten metal at the end of the wire increases in size larger than the wire diameter and dangles chaotically under the wire before detachment. Known as globular transfer, presumably due to the expansion of trapped air, it creates instability, a less focused arc, and shallow penetration. Another issue is that the instantaneous melt-off rate may not be as uniform as solid wire because the compactness or density of the powder in the core of tubular wire is not as homogeneous as the integral metal core of the solid wire. A further issue is the non-uniform heating and melting of the solid sheath and powder core, where the outer sheath may melt first, sometimes asymmetrically, and where the core material (e.g., tungsten carbide) is left to be dropped into the weld pool un-melted in solid form and bounced off the pool surface without being absorbed into the pool. What is needed is a system and a method that can economically produce custom chemistry or composition wire in solid form or a customized form to combine the merits of both solid wire and tubular wire.

BRIEF SUMMARY

Methods and systems are provided for producing a wire (e.g., a solid wire, other types of wire) with custom chemistry or composition using additive manufacturing methods substantially as illustrated by and/or described in connection with at least one of the figures, as set forth more completely in the claims.

BRIEF DESCRIPTION OF THE DRAWINGS

FIG. 9 shows an embodiment of the near-net shape wire being drawn through a drawing die according to the present disclosure.

DETAILED DESCRIPTION

Aspects of some embodiments according to the present disclosure relate to the art of manufacturing consumable filler metal that can be used in welding, joining, cladding, soldering, surface overlaying, hard facing, and brazing processes, for example. Filler metal can be used as a consumable electrode in some types of joining or surface processing, or as a non-electrode filler rod in other types of joining or surfacing processes. Although circular geometry wire is most commonly used, other shapes such as flat or rectangular ribbon or strips are also used in practice. Thus the term "wire" in the present disclosure applies broadly to shapes other than round shaped wire, and the term "welding" in the present disclosure broadly encompasses other related processes.

Some embodiments of the present disclosure relate to systems and methods for manufacturing solid welding wire by additive manufacturing techniques.

Some embodiments of the present disclosure provide for additive manufacturing or three-dimensional (3D) printing, for example, being used with sintering technologies including selective laser sintering and micro-induction sintering. These sintering technologies are based on compacting powder and forming a solid mass by heating and/or by applying pressure without totally melting the powder particles. Laser and induction heating, for example, can be used as a heating source. Other heat sources or processes such as electron beam, TIG, reciprocating wire controlled short circuiting MIG, resistance seam welding, friction welding and ultrasonic welding can be employed for additive manufacturing.

Some embodiments provide that a fine powdery material is sintered or melted or soldered onto a metal strip substrate in a compacted solid form or a near-net shape (e.g., a near-net solid wire shape) before being turned into a final product through forming or drawing dies.

Figure 1:
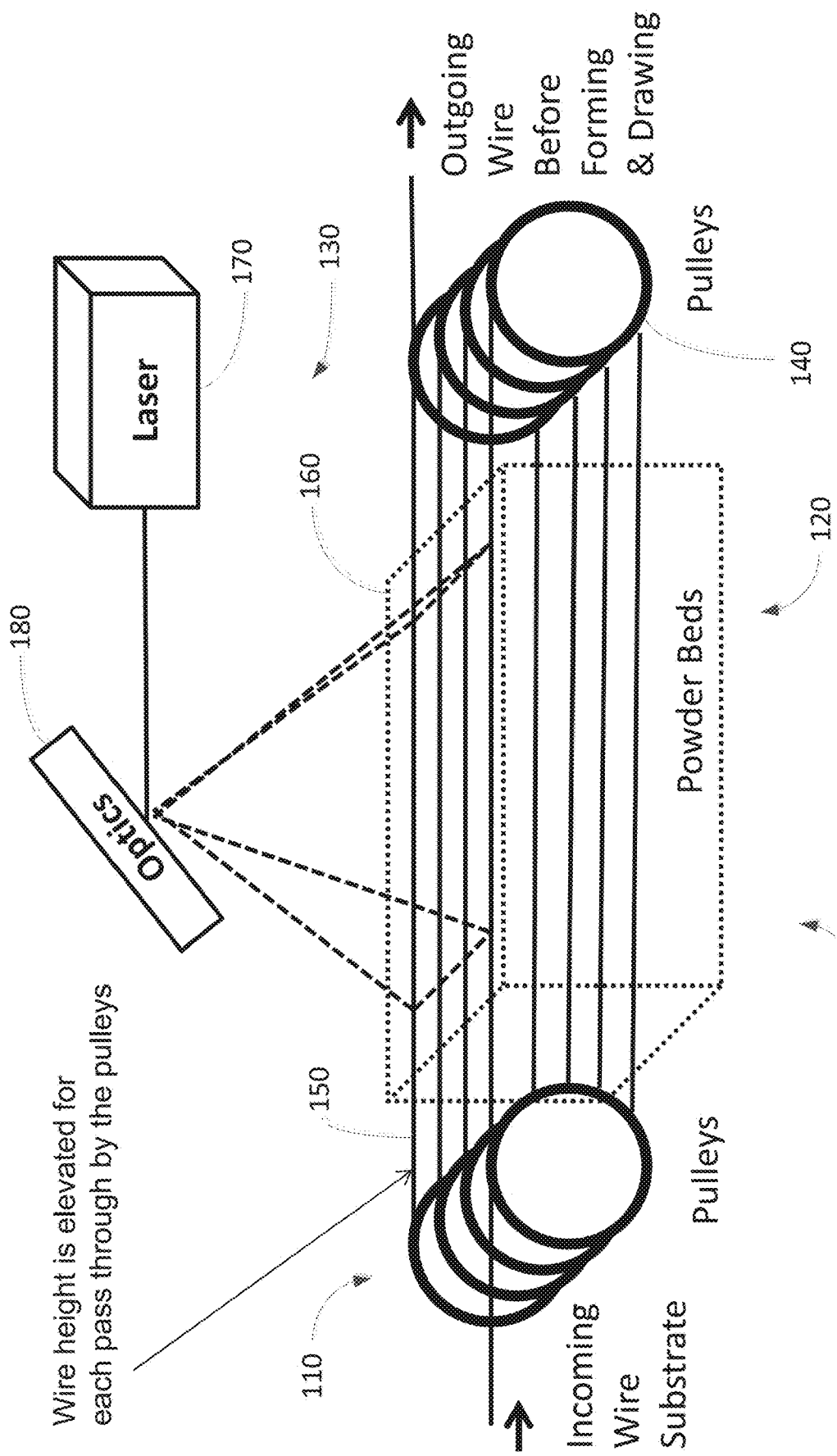
FIG. 1 shows an embodiment of powder based feedstock 3-D printing onto a moving strip substrate according to the present disclosure.

FIG. 1 shows an embodiment of a system and method for manufacturing solid welding wire by additive manufacturing techniques. The system 100 includes, for example, a substrate transport system 110, a material source 120, and a heat source 130. In some embodiments, the material source 120 delivery and heat source 130 are integrated into one process head. Referring to FIG. 1, the substrate transport system 110 includes, for example, one or more pulleys 140, which might include motorized drive rolls, that are arranged to pull a wire substrate 150 through the material source 120 and past the heat source 130. In some embodiments, the material source 120 includes, for example, one or more powder beds 160. The material source 120 provides the materials for deposition on the wire substrate 150. The heat source 130 includes, for example, one or more lasers 170 and one or more optical devices 180 (e.g., lenses, mirrors, filters, etc.). The heat source 130 is configured to provide the heat that assists the deposited materials to form a solid on the wire substrate 150. In some embodiments, the pressure around the wire substrate 150 is also controlled to further facilitate the solidifying of the deposited materials with the wire substrate 150.

In some embodiments, the wire substrate 150 includes a metal strip as a substrate. The metal strip can be flat or curved. For example, the metal strip can be a flat belt, a C-shaped strip, a U-shaped strip, a V-shaped strip, or a semi-circular shaped strip.

In some embodiments, the material source 120 can include a dam or a wiper that is configured to control the height of the powder on top of the wire substrate 150. The dam can be positioned in front of or operationally before the heat source 130. Since the wire substrate 150 can change direction as it passes through the power bed 160, the wiper (or dam) can be arranged in a position that corresponds to the movement of the wire substrate 150. In one example, the wiper (or dam) can be stationary and set to a certain gap above the moving substrate where the gap corresponds to the build-up height. In another example, the single powder bed 160 in FIG. 1 may be split into separate powder chambers so that the height of each powder bed 160 can be separately managed for each lap that the metal strip of the wire substrate 150 passes under the heat source 130 (e.g., a laser).

In some embodiments, the wire substrate 150 can be pre-heated prior to being exposed to the sintering heat source. In some embodiments, the pre-heating phase may be accomplished by induction, radiated heat, etc. without melting the powder.

In some embodiments, a gravity drop is arranged to apply the powder. In a gravity drop, the powder is dispensed from a hopper above the moving wire substrate 150 at a certain rate and dropped or belt fed onto the moving conveyor of the wire substrate 150 ahead of the heat source 130. A catch pan or bed can be arranged below for collecting and recycling the excess powder.

In some embodiments, the heat source 130 can include one or more lasers and the laser power distribution can be arranged so that the build-up is of a line or rectangular shape, for example, that matches with the width of the next layer of build-up. Other beam patterns such as a cross, a star, a polygon, a ring, an oval, an infinity sign, a twin-spot, a triple-spot, a quad-spot, etc. can be used to control the solidification rate, microstructure, defect, discontinuity, and residual stress of the build-up; and work hardening and columnar strength of the WIP wire. The patterns may be generated optically without moving parts or by mechanical oscillation of optics. The laser energy distribution can be top hat, Gaussian, multimode, or others. Laser power may be controlled based on the melting temperature of the powder. For example, higher power density can be used for metal powder and lower power density can be used for flux compounds. In some embodiments, the heat source 130 can include one or more micro-induction heating heads that employ high frequency induction heating transducers powered by one or more radio frequency power supplies. The induction heating head can include a magnetic flux concentrator that is configured to apply a spatially compact magnetic field to sinter small granular particles/powder into solid form onto a metal substrate or strip of the wire substrate 150.

In some embodiments, the heat source 130 can include, for example, one or more lasers 170 and one or more optical devices 180 (e.g., lenses, mirrors, filters, etc.). The laser 170 and the optical device 180, which is configured to manipulate the laser beam from the laser 170, are simplified for illustration in FIG. 1. The laser beam emitted by the heat source 130 can be arranged so that it is shared among multiple work-in-process (WIP) wires as the wires are progressively built-up over multiple passes through the material source 120. In some embodiments, the optical device 180 can include, for example, one or more of the following: a refractive, transmissive, or reflective objective focusing lens; a structured light pattern projection; a beam splitter; a galvanometer; a mirror; and a closed-loop servo positioning system. In some embodiments, the optical device 180 can incorporate a variable collimator and/or zoom homogenizer to adjust zoom on-the-fly and control the focal position and energy density. In some embodiments, the laser 170 and/or the optical device 180 are stationary. In some embodiments, the laser 170 and/or the optical device 180 move during operations. For example, the optical device 180 can move in a periodic pattern (e.g., swivel periodically) so that the laser beam is directed to different parts of the powder bed 160 or the wire substrate 150. The optical device 180 can also include, for example, shutters, apertures, purging gas nozzles, air knifes, and cover slides.

In some embodiments, a wire vibration or wire actual position detector can be configured at or near the wire surface to be built up and used to sense wire position prior to exposing the wire substrate 150 to the heat source 130, either before or after the wiper/dam. The actual position of wire substrate 150 is sent to a system controller to guide the optical device 180 (e.g., the optics) to aim the laser at the incoming wire substrate 150. The actual wire position can be used, for example, in a feedback control of a galvo-mirror system for beam positioning and focus. A 500 W to 5 kW ytterbium fiber laser can be configured to fuse fine metallic powders onto the substrate with a spot size commensurate with the width of the desired build layer. Some embodiments contemplate using other lasers including, for example, a disk laser, a semiconductor laser, a diode laser, direct diode lasers such as TeraDiode (e.g., using wavelength beam combining with free-space optics) or coherent beam combining or side-by-side beam combining to increase beam brightness, other rare-earth element doped fiber laser, double-clad fiber laser, a crystal laser, an Nd:YAG laser, a gas laser, a $CO_2$ laser, a continuous wave laser, a pulsed laser, an excimer laser, and a femtosecond laser. Different laser may be chosen for different types of wire material, wire size, and other wire properties.

In operation according to some embodiments, a wire substrate 150 is pulled by pulleys 140 of the substrate transport system 110 through the powder bed 160 of the material source 120. The powder bed 160 can be a powder feedstock or bed as is used in three-dimensional (3D) printing. Powder is deposited on the wire substrate 150. A stationary wiper or dam in front of or before the heat source 130 controls the height of the powder or powder level by sweeping away or leveling the powder deposited on the wire substrate 150 as the wire substrate 150 passes under or by the stationary wiper or dam. As the wire substrate 150 moves through the powder bed 160, the optical device 180 focuses the laser beam from the laser 170 to one or more locations in the powder bed 160 to heat the powder deposited on the wire substrate 150. By controlling the heat, the wire speed and possibly the pressure, the powder deposited on the wire substrate 150 is sintered or melted or soldered into a solid wire form. In some embodiments, the wire substrate 150 can change directions for each pass through the powder bed 160 in which successive layers are built onto the wire substrate 150. Through each pass, the shape of the built-up layers progressively changes into an approximately rounded shape or near-net shape. The near-net shape wire 150 can then be turned into a final product wire by passing the near-net shape wire 150 through forming or drawing dies. FIG. 9 shows an embodiment of the near-net shape wire 150 being drawn through a drawing die 190 (or a drawing plate in another embodiment), for example, to reduce the wire diameter, to shape the wire, and to form the final wire product. Although considered in final product form, some embodiments contemplate baking, and/or adding a coating (e.g., copper) and/or arc stabilizers (e.g., potassium or sodium) or other steps to the final wire product to prevent oxidation and to provide lubrication.

Because the wire substrate 150 after additive manufacturing is near-net shape, the amount of diameter reduction from subsequent drawing benches can be significantly reduced. As a consequence, the hardening and annealing process can be reduced or eliminated in some embodiments. The near-net shape WIP wire improves the manufacturability of special alloys of high carbon equivalent and/or high hardenability and small diameter fine wire with less possibility of wire break in manufacturing.

Figure 2:
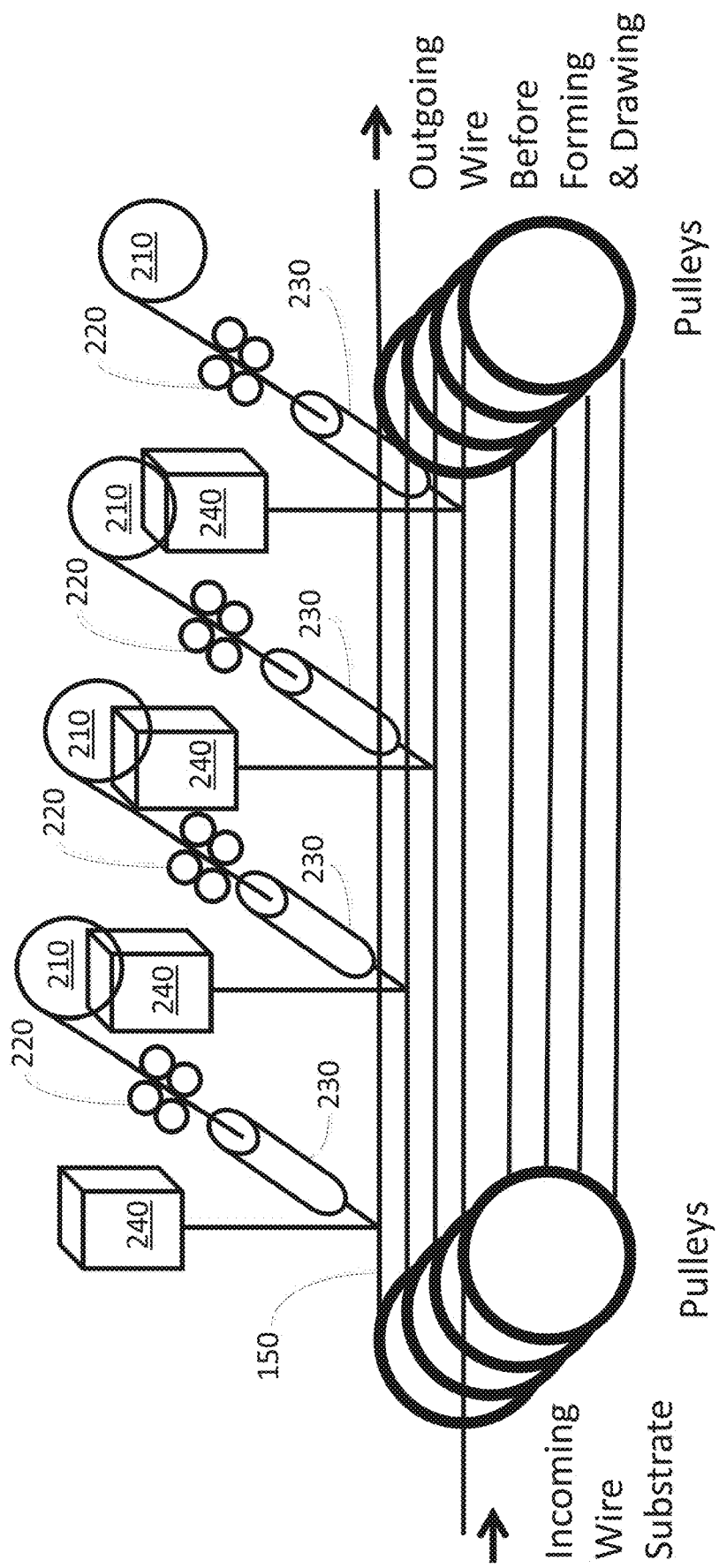
FIG. 2 shows an embodiment of wire based feedstock 3-D printing onto a moving strip substrate according to the present disclosure.

FIG. 2 shows another embodiment of additive manufacturing of solid wire using wire feedstock. In this embodiment, the material source 120 employs a wire feeding system 200 instead of (or in addition to) a powder bed 160 as the feedstock of additive material. The wire feeding system 200 can include, for example, a wire supply 210, a feeder 220 (e.g., drive wheels), and a heater 230. Some embodiments contemplate using a rod instead of wire as a material feedstock. Another heat source 240 can optionally be employed. The heat source 240 can be, for example, a resistive, inductive heater. FIG. 2 also shows that each pass of the wire substrate 150 has its own wire feeding system 200 and, optionally, its own heat source 240.

In operation, the wire feedstock is pulled by the feeder 220 from the wire supply 210 and fed through or by the heater 230 for deposition onto the wire substrate 150. The heater 230 provides heat to make the wire from the wire supply 210 "hot" before deposition onto the wire substrate 150. In some embodiments, the heater 230 heats wire substrate 150 so that wire feedstock is melted or incorporated on contact with the wire substrate 150. It is also possible that the four instances of wire supplies 210 in FIG. 2 are made of different compositions enabling flexible manufacturing for producing different chemistry WIP wires from the same production line simply by programming the selective combination of wire supplies from the bank of wire suppliers.

In some embodiments, the heater 230 is part of a welding torch that uses a controlled short circuiting process with reciprocating wire feed from the feeder 220 to draw an arc by lifting depositing wire from the wire substrate 150 and to form a short circuit by plunging the wire feedstock into the substrate melt pool. In this case, most of the heat is generated when the arc is present.

In some embodiments, a laser, a tungsten inert gas (TIG) arc, or a plasma arc, for example, can be used as the heat source with wire feed from the feeder 220 to supply additive material. The wire being fed from the feeder 220 can be un-heated (i.e., a cold wire), or, alternatively, the wire can be pre-heated (i.e., a hot wire). The wire being fed from the feeder 220 can be solid wire, or tubular wire with metal sheath outside and powder inside.

Figure 3:
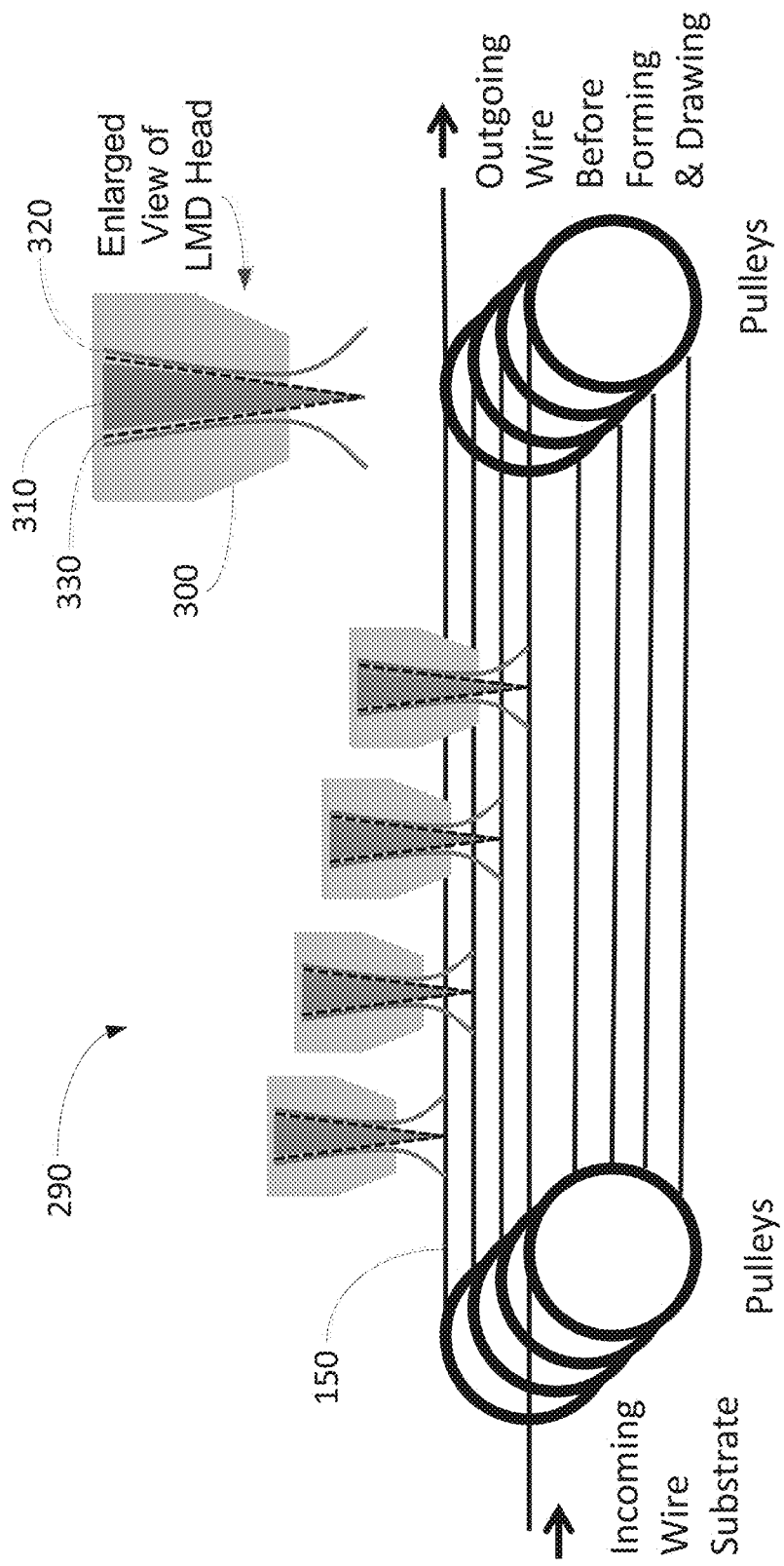
FIG. 3 shows an embodiment of additive manufacturing of solid wire with laser metal deposition (LMD) according to the present disclosure.

FIG. 3 shows an embodiment of additively manufacturing solid wire using laser metal deposition (LMD). The LMD system 290 has an LMD head 300 that coaxially delivers the laser beam 310, gas 320 (e.g., shielding gas) and powder 330. The powder 330 can be conveyed by gas (or blown) and/or by gravity towards the wire substrate 150 that is moving underneath the LMD head 300. LMD is a process that uses a high energy density beam 310 (e.g., a laser beam) to melt the wire substrate 150 as powder 330 is fed into the melt. Although a laser beam 310 is shown, some embodiments can use other heat sources such as an electron beam or a plasma arc. The powder 330 melts to form a build-up that is metallurgically fused to the wire substrate 150. The process head 300 typically has a cone shaped end in which the powder 330 is conveyed by gas towards the substrate 150 where the laser beam 310 is focused on. The head 300 can be configured to project multiple powder jets onto the substrate 150. Each powder jet can be fed by powder feedstock of different chemistry. FIG. 3 shows an arrangement of four LMD heads 300. Each head 300 adds a new layer onto the wire substrate or WIP for gradual build-up. Preferably, in some embodiments, the deposit material is fused onto the end of the WIP wire in a flat position (e.g., WIP wire end pointing up) so that the powder 330 is conveyed in a downward position. The powder flow rate can vary, for example, from 1 to 100 g/min., depending on the WIP wire size and the laser power. In some embodiments, a fiber laser can be selected and the laser power can range from 500 W to 10 kW. The gas flow rate can range from 2 to 10 L/min. Although FIG. 3 shows an embodiment of a coaxial head 300, some embodiments provide that the powder 330 can be delivered non-coaxially from the side of the laser beam or even externally with respect to the head 300.

Figure 4:
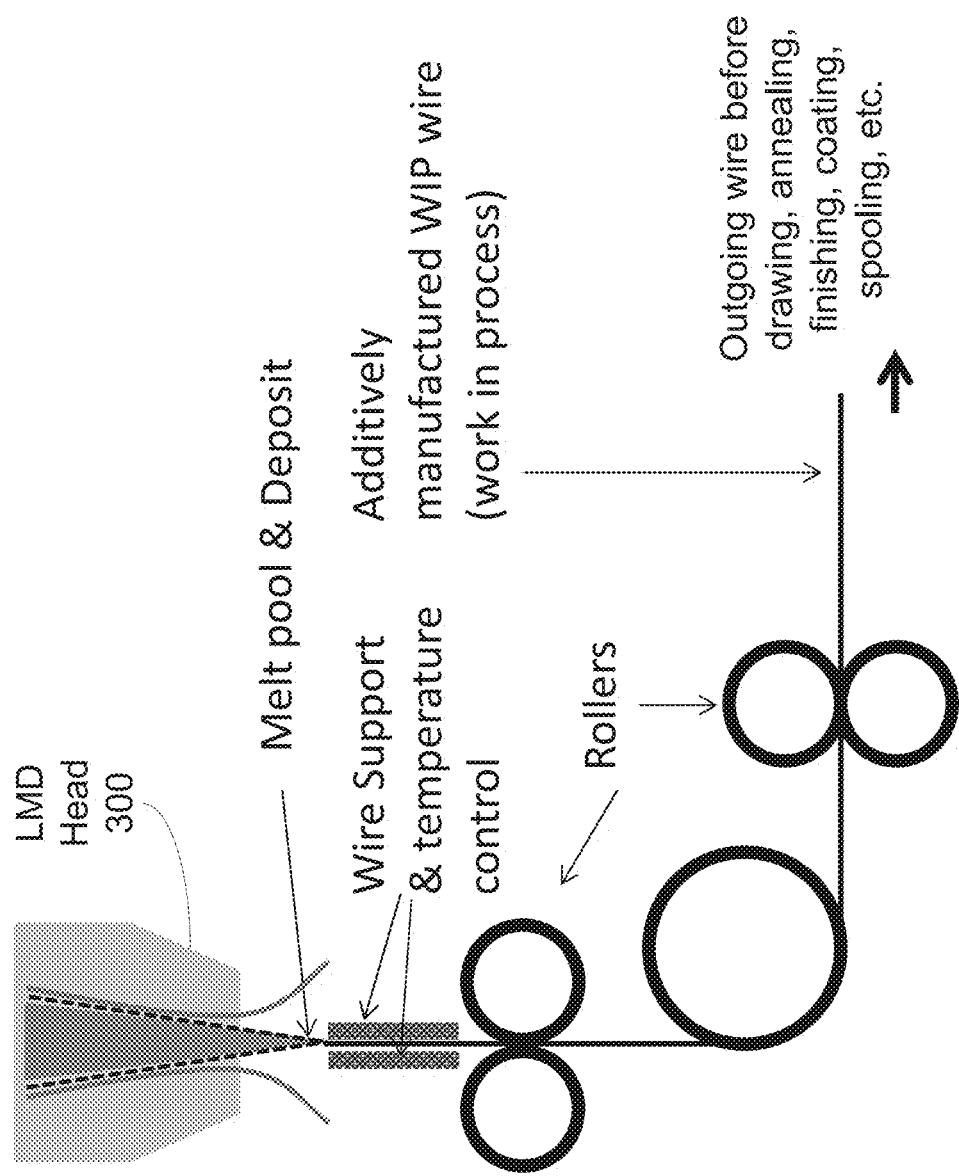
FIG. 4 shows an embodiment of additive manufacturing of solid wire with LMD according to the present disclosure.

FIG. 4 shows another embodiment of additively manufacturing solid wire using laser metal deposition (LMD). The build-up is on one end of the wire (or axially), and the deposition rate or the buildup rate matches with the take-up rate by rollers to remove the WIP wire away from the LMD process head. Although FIG. 4 illustrates LMD for printing wire axially, other printing processes such as controlled short circuit with reciprocating wire feed using an arc welding process with wire feedstock (or a bank of feedstocks) is also possible. Some embodiments use electron beam direct manufacturing or electron beam additive manufacturing, with either powder feedstock or wire feedstock, to print WIP welding wire axially in vacuum.

Figure 5:
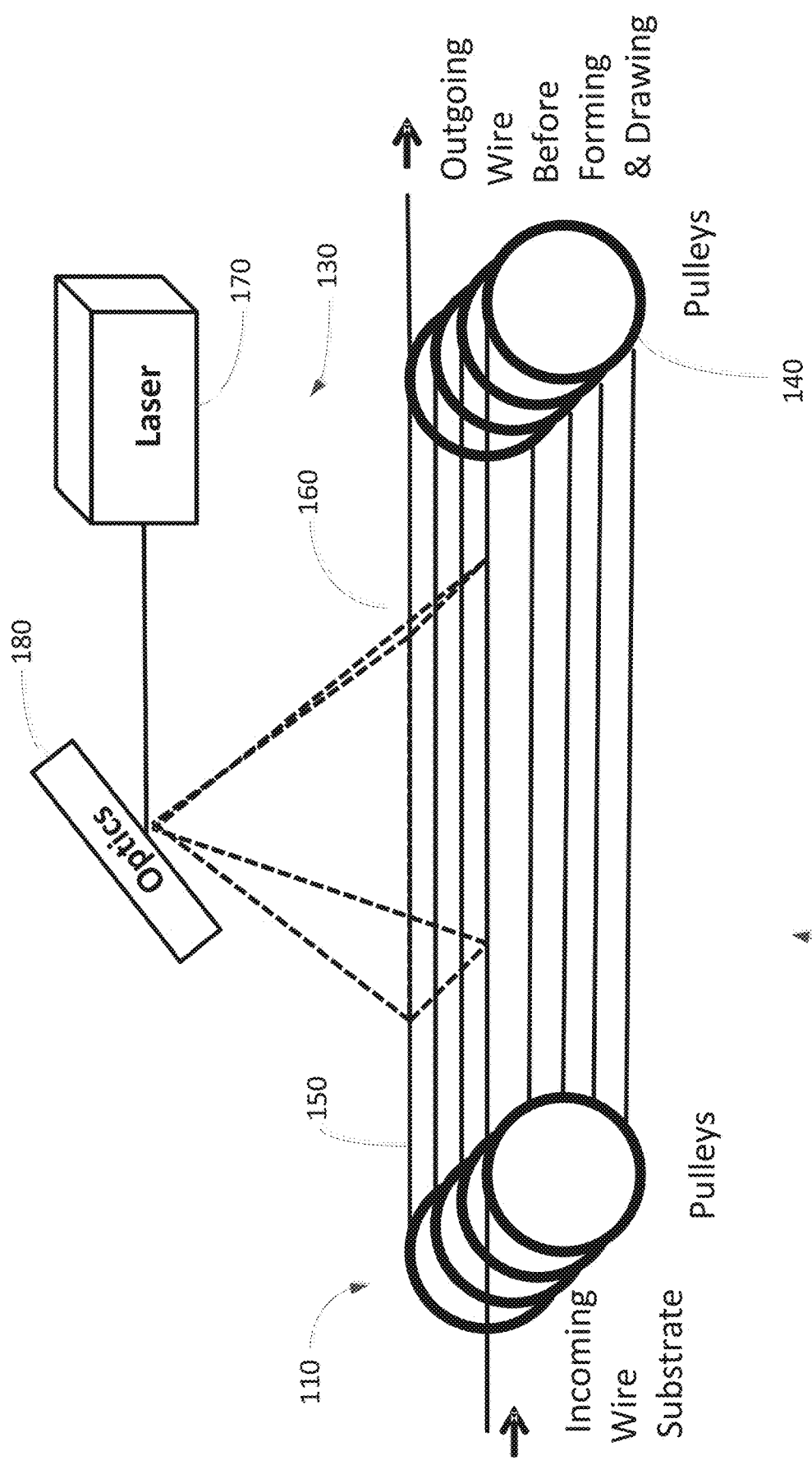
FIG. 5 shows an embodiment of work-in-progress (WIP) wire processing according to the present disclosure.

FIG. 5 shows an embodiment of laser processing of WIP wire. In some embodiments, the laser processing system 340 is configured to modify surface properties and/or geometry of the wire substrate 150 (e.g., a WIP wire) without powder or a material source 120. In some embodiments, the heat source is used to bond metal strips together and/or to close the seam of WIP wire. The system 340 includes, for example, the substrate transport system 110 and the heat source 130. Referring to FIG. 5, the substrate transport system 110 includes, for example, one or more pulleys 140 that are arranged to pull the wire substrate 150 past the heat source 130.

In some embodiments, the heat source 130 includes, for example, one or more high energy density beam heat sources 170 (e.g., lasers) and one or more optical devices 180 (e.g., lenses, mirrors, filters, etc.). The heat source 130 can be configured to modify surface properties and/or geometry of the wire substrate 150 (e.g., a WIP wire) without powder, for example.

In some embodiments, one or more lasers 170 can be used for surface marking and/or texturing, for example, to reduction the friction or contact force between the wire and the liner when the wire is pushed and/or pulled through the liner (e.g., during a welding operation). The laser 170 can be used to modify the wire stiffness (e.g., tendency for wire to buckle), asperity-to-asperity contact between the wire and the liner, and a coefficient of friction to improve wire to liner pressure distribution and thus improve wire feedability, for example, during a welding operation. Feedability can be affected, for example, by friction forces or contact forces between the wire and the liner.

In some embodiments, the laser 170 can introduce ridges in the range of 20-160 μm, for example, which along with boundary lubrication, reduce friction fluctuation which can increase line and torch tip life in welding operations. In some embodiments, the laser 170 (e.g., a femtosecond laser) can induce periodic surface nanostructures (LIPSS) which lowers the friction coefficient compared with a smooth surface.

In some embodiments, the laser 170 can be used in subtractive micro hole drilling or micromachining to create cavities on the exterior of the wire in order to reliably retain the proper amount of surface additives such as arc stabilizers (e.g., potassium or sodium) or lubricants for feedability or chemicals for wire identification to be detected by chemical sensors in the wire delivery devices (e.g., torch, feeder, conduit, etc.) during welding.

In some embodiments, the laser 170 can be used to introduce residual stress (e.g., compressive and/or tensile stress) in certain patterns so that elastic/plastic deformation can be retained for wire cast and helix. When large enough residual stresses are retained, it is possible for the welding wire to make a designed spin motion after it exits the contact tip in the welding torch and to cause the arc to spin.

In addition to the processes described with respect to FIGS. 1-4, some embodiments contemplate using other variations of additive processes including, for example, cold spray, high velocity oxy-fuel spray, twin-wire electric arc spray, and flame spray with either powder or wire. In FIG. 4, for example, the LMD heads 300 can be replaced by cold spray/thermal spray heads for additively manufacturing welding wire. In cold spray, the gas (e.g., $N_2$, $H_2$, or air) and can be preheated in the range of 400-600° C. by a 4-15 kW heater with a pressure in the range of 250-500 psi to accelerate powder particles at supersonic speed onto the WIP wire substrate 150. Some embodiments contemplate combining cold spray with a laser beam so that after the powder is sprayed on, the build-up is further heated or sintered or melted or soldered by the laser beam.

Figure 6:
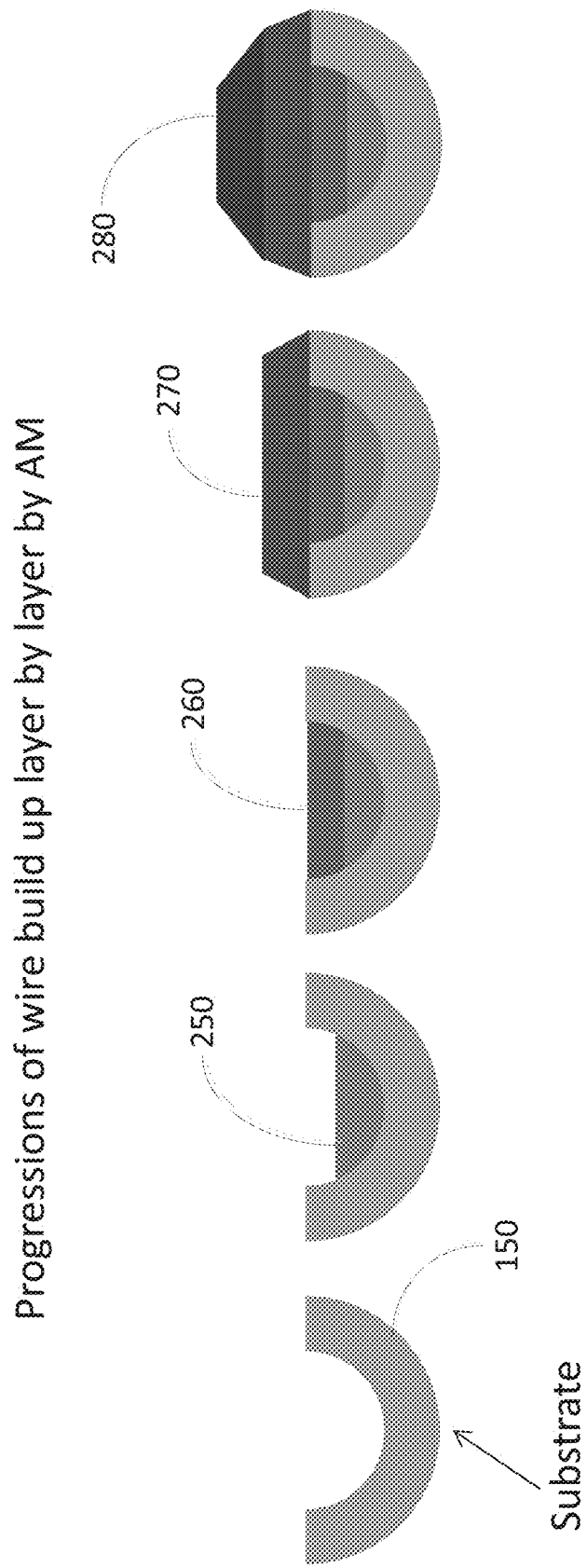
FIG. 6 shows the progression of build layers from original strip to near-net shape prior to further drawing and heat-treatment stages to produce the finished wire according to an embodiment of the present disclosure.

FIG. 6 shows an embodiment of a progression of layers using additive manufacturing techniques to form a round solid wire. A C-shaped substrate 150, for example, is employed. On a first pass through the material source 120, a first layer 250 is deposited and formed into a solid WIP wire with larger cross-sectional area. On a second pass, a second layer 260 is deposited and formed into a solid WIP wire with an even larger area. On subsequent passes, a third layer 270 and a fourth layer 280 are deposited and formed into an even larger solid WIP wire. The third layer 270 and fourth layer 280, for example, are deposited and formed into a rounded near-net wire shape.

The progression of layers illustrated in FIG. 6 is a simplified progression of a WIP wire. A C-shaped substrate 150 is shown, but some embodiments contemplate using other types of substrates such as a flat strip and using drawing dies to form the round bottom shape. Some embodiments also contemplate using U-shaped or V-shaped substrate 150. Although four passes are shown, more or less than four passes may be desired in practice. For example, ten laps in which each lap adds 0.1 mm can be used to create a 1 mm build thickness. Further, some embodiments contemplate that each layer can have different or custom composition rather than a uniform composition for all layers. With respect to the process in FIG. 1, for example, each powder bed chamber 160 can have a different powder mixture. With respect to FIGS. 2-4, for example, each wire feedstock can have a different wire chemistry or can be of a different wire type.

Figure 7:
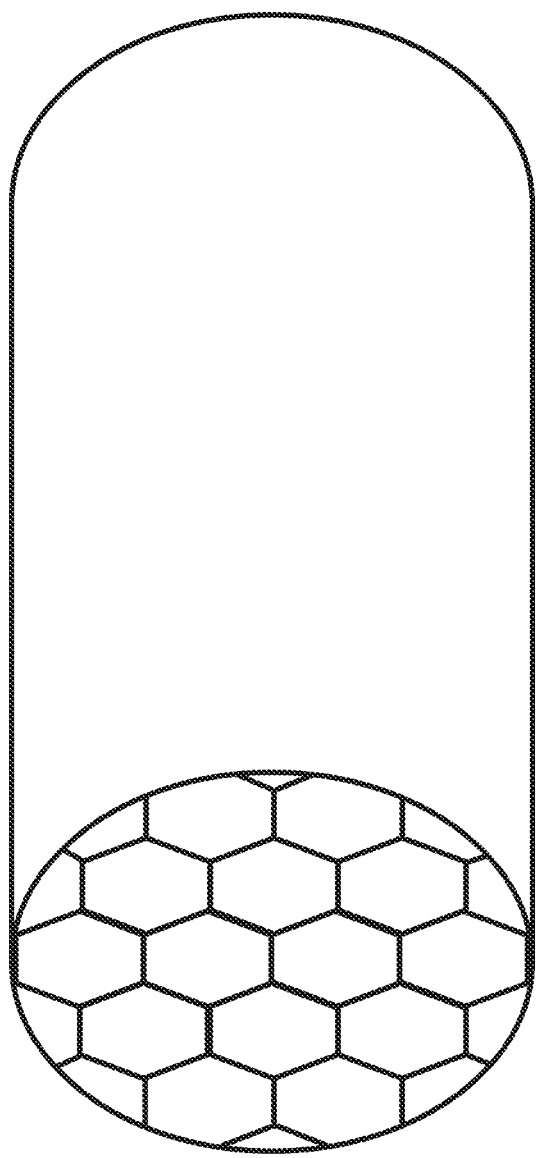
FIG. 7 shows an embodiment of a printed wire with solid skin in the exterior and structured interior (e.g., a honeycomb structure as an example for illustration) according to the present disclosure.

FIG. 7 shows an embodiment of a wire manufactured by the additive manufacturing techniques in which the wire has a smooth and continuous exterior skin and a honeycomb interior. Some embodiments contemplate using other shapes (e.g., triangles, quadrilaterals, polygons, arcs, curves, etc.) instead of or in addition to the honeycomb shape. In addition to completely "solid" wires, some embodiments contemplate manufacturing a porous wire with a one or more cavities in the middle using additive manufacturing techniques, while maintaining a smooth exterior (or skin) for efficient wire feeding. In one embodiment, a hollow wire with a ring cross-section can be produced.

Such custom-made, additively manufactured wires can find a number of applications. For example, a custom-made wire with a porous interior can be used for gas metal arc welding (GMAW) welding and can increase the electrode extension heating effect with higher resistivity; increase deposition with reduced heat input, reduced manganese fume, and reduced undercut; change arc width/shape/stability, puddle fluidity, bead profile and penetration profile; propensity towards defects and discontinuity; and possibly reduce the threshold for spray transition current allowing lower rating and lower cost power sources for the same gauge base metal and duty cycle welding and reduced electric power consumption. Larger outside diameter (OD) porous solid wire, for example, can be welded at a much lower current than same wire with a completely solid interior. Larger OD diameter can be used with internal ribs for added structural integrity against buckling for wider arc (yet lower welding current) to dramatically increase operator skills forgiveness or fit-up tolerance. Instead of a hollow interior, some embodiments contemplate a more elaborate interior structure, such as periodic hollow compartments separated by solid walls (e.g., honeycomb structures, etc.) to increase structural rigidity or stability for the subsequent drawing process or for the feeding process. By changing the porousness of the interior, the resistivity can be adapted for a given length and outer diameter.

In some embodiments, the porous interior of the solid wire can be used as a conduit for a gas medium. In welding applications, the gas can be conventional shielding gas, or assist gas with special additives to reduce diffusible hydrogen or reduce aluminum cathodic cleaning track, or pulsed pressure or constant high pressure gas for increasing puddle depression and weld penetration. High pressure air or gas delivered by carbon wire as a conduit can be used for high efficiency carbon arc gouging or cutting.

Figure 8:
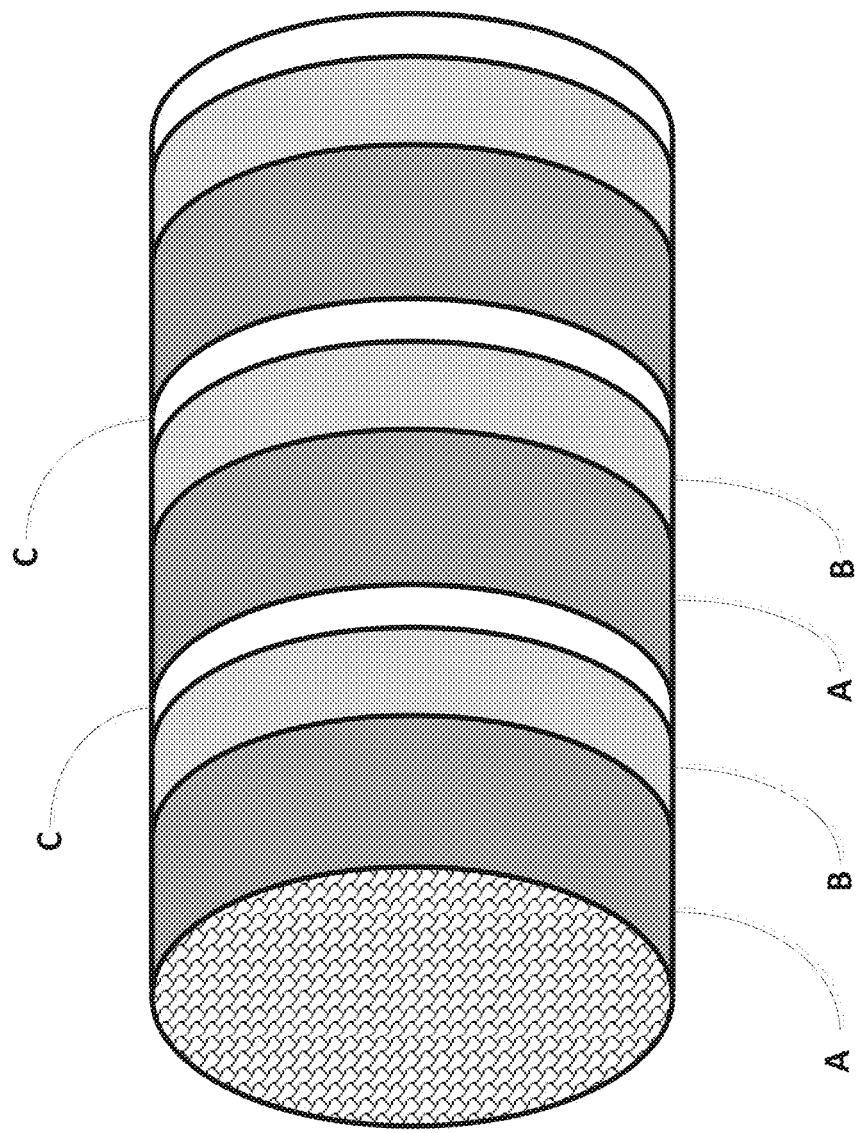
FIG. 8 shows an embodiment of a printed wire with lengthwise patterns of interior structural variation or compositional variation according to the present disclosure.

FIG. 8 shows an embodiment of an additively manufacture wire in which the wire has length-wise patterns of structure or composition. In some embodiments, different material sources 120 can be arranged in an adjacent configuration to produce, in successive layers, length-wise patterns of structure or composition. Referring to FIG. 8, the wire can comprise the length-wise pattern of sections A, B, and C repeated over a particular length. Sections A, B, and C can represent, for example, three different material compositions (e.g., chemical compositions). In addition, sections A, B, and C can represent different structural compositions (e.g., solid, honeycomb, and hollow). Yet further, sections A, B, and C can have different physical properties (e.g., different melting points, different magnetic properties, different densities, different masses, different conductivity, different resistivity, etc.).

In one embodiment, an internal wire structure and or material composition comprises a pattern that repeats at a fixed length. In some applications, as the wire moves under a magnetic sensor or optical sensor, for example, the pattern may be used to sense actual wire feed rate. The magnetic sensor can be a contact-less sensor to measure actual wire speed. This is in contrast with using a roller, for example, that is pressed in contact with wire to sense wire speed.

Some applications of this type of wire according to some embodiments contemplate synchronizing the welding waveform or laser power with the interior wire structure sensed by the non-contact magnetic or optical sensor to improve metal transfer in arc/laser welding, cladding, hot-wire or cold-wire TIG or plasma, and brazing with wire. For example, the additively manufactured wire can have a band of carbon steel composition with high aluminum alloy content, interleaved with a band of carbon steel composition of low aluminum alloy. The controlled short circuiting with reciprocating wire feeding welding process can be employed in such a way that the high aluminum band is burned off or consumed in the arc phase, while the low aluminum band is dipped into the weld pool in short circuit without subjecting to arc heating. In another example, bands of high silicon can be interleaved with bands of low silicon where the high silicon bands are delivered with a synchronized torch weave or wire spin to the weld toes with higher puddle fluidity (and better toe geometry and fatigue life), while maintaining the overall silicon level to the wire chemistry specification. Further, in another example, bands of low martensitic transformation temperature chemistry wire or LTTW (e.g., 10% Cr-10% Ni) may be delivered synchronously to the weld toes to induce compressive stress at the toes and thus increase fatigue life of the welded structure without making the entire wire out of the expensive LTTW chemistry for carbon steel welding. Other synchronization between wire pattern and arc characteristics/metal transfer mode is also contemplated, such as synchronizing arc polarity and arc current level with the repeatable bands in the wire. In one example of synchronization, bands of expensive alloying elements (e.g., Ni, Ti, Mo, rare-earth metals, etc.) can be transferred during the "electrode negative" or straight polarity phase of the AC waveform during welding, so they are substantially transferred into weld the metal without being burned up in the arc. Geometrical features in the interior or exterior of the solid wire can be sensed and used to signal to the welding power source (e.g., a welding power supply) to flip the polarity of its output.

The cost of metal in powder form is usually much lower than in coil (e.g., green rod) form. The additional cost of additive manufacturing equipment depreciation cost can be offset by the savings from raw material in solid wire filler metal manufacturing.

In some embodiments, internal wire structure can include a "code" for wire identification (e.g., wire diameter, wire type, etc.). The code can be a geometric pattern of varying internal structure, cross-sectional area, or mass. As the wire moves under a magnetic sensor, the code can be read to identify the wire type, wire diameter, etc.

In some embodiments, solid wire is manufactured with a solid interior core made of different chemistry than the solid exterior so that the melting temperature of interior is substantially lower than that of the exterior to reduce the "pencil" shaped wire end when it is melted in the GMAW arc. This allows for pure argon shielding gas GMAW welding without oxygen or carbon dioxide in the shielding gas and yet maintains process stability to achieve desired weld ductility.

Some embodiments provide for the pattern printing of different wire chemistry along the length of the wire. For example, some embodiments contemplate printing a pattern of alternating low melting point composition wire "slice" and high melting point wire segment. When the trailing low melting point wire slice melts, the leading high melting point wire falls off into the weld pool, thus increase melt-off efficiency. Energy is not wasted, for example, attempting to melt the high melting point wire so that it can fall into the weld pool. This improves heat efficiency by reducing heat input into the work piece and can benefit from increased deposition rates.

Some embodiments provide for the manufacture of metal matrix composite wire, nanoparticle wire, and tungsten carbide cladding wire previously not possible in solid wire form.

Although some embodiments contemplate that the drawing process occurs after the additive wire building process, some embodiments are not so limited. Some embodiments contemplate mixing the drawing process (e.g., wire forming) with the additive process, or contemplate intertwining them. For example, after one pass of build-up, the WIP wire can be pulled through drawing die(s) (or drawing plates) to shape the WIP wire more precisely for the next lap of build-up. In particular, roller die drawing or roll drawing can be used to turn near-net shape wire from additive manufacturing process into finished dimension wire, with reduced work hardening, drawing forces, die wear and wire breaks. Drawing dies may be submerged in water for wet draw. Some embodiments provide that the drawing die does not have a round hole but a profile (e.g., an intermediate shape (with flat top) such as in FIG. 6) with a block or Turk's-head machine in the drawing bench. To reduce drawing force, some embodiments use roller die drawing or roll drawing, instead of fixed dies to convert shear friction into rolling friction. In addition to mixing additive deposition and drawing processes, some embodiments incorporate or mix in a subtractive process, and/or a heat treatment process such as inter-pass forming, cooling process, stress relief process and annealing process, integral to the additive deposition build-up process.

Some embodiments provide for in-situ metrology, in-situ process control, and in-situ quality control in additive solid wire production. Some embodiments provide in line non-contact inspection including, for example, laser ultrasound to detect bulk porosity for interior integrity, and micrometer measurements for WIP wire exterior dimension and shape, which can be part of adaptive process control. A temperature sensor or a pyrometer camera can be used to measure temperature and size of a melt area, and thermal gradient can be determined for predicting microstructures and propensity for defect.

Some embodiments provide in-situ self-diagnostics mechanisms. Sensors can be deployed to detect laser protective cover lens cleanliness condition, leaky resonator, shift of laser focus, etc. to provide an alert for preventative maintenance. A calorimeter can be used in the area of additive manufacturing for measuring actual laser power, power density, beam quality (e.g., beam parameter product or BPP, or $M^2$), and for checking against power set-point. If a discrepancy is found, an increase in laser power set point to match, or a shutdown to check optics and beam delivery can be triggered. Power level sensors can be used and wire feedability and feeding force sensors may be built into the system for potential shutdown and preventative maintenance.

Some embodiments provide for building a near-net shaped solid wire that, for example, effectively reduces the number of draw downs. In some embodiments, the near-net shaped wire has a porous internal structure and an external surface. In some embodiments, the near-net shaped wire has a hermetically sealed exterior. In some embodiments, the near-net shaped wire has different compositions or constitution that repeat in a length-wise direction of the near-net shaped wire. In some embodiments, the near-net shaped wire has different physical properties that repeat in a length-wise direction of the near-net shaped wire. In some embodiments, the finished solid wire is consumed in an electric arc or high energy density beam for welding, brazing, or cladding. In some embodiments, the finished solid wire is consumed in an electric arc or high energy density beam for cutting or gouging.

Some embodiments provide a system for manufacturing a wire or a welding-type filler metal wire. The system can include, for example, an LMD head or a direct manufacturing electron beam or an electric arc torch that is configured to deposit a material and to heat the deposited material to additively manufacture a near-net shaped wire in an axial direction of the near-net shaped wire; a transportation system configured to axially move the wire away from the laser metal deposition head, wherein the transportation system and the laser metal deposition head are matched in speed; and a plate assembly or a die assembly configured to draw down a diameter of the near-net shape wire into a finished wire. In some embodiments, the LMD head is configured to coaxially provide a laser beam, a material, and a shielding gas. In some embodiments, the near-net shaped wire axially builds up.

Some embodiments provide a method for manufacturing a wire or a welding-type filler metal wire. The method can include, for example, one or more of the following: moving a metal substrate, by a transporter system, through or by a material source system; depositing a layer of material on the metal substrate during each pass through or by the material source system; building via sintering or melting the layer of a deposited material on the metal substrate after each pass through or by the material source system; and forming the finished solid wire by drawing the built material together with the metal substrate through a drawing plate assembly or a drawing die assembly. In some embodiments, the deposition of the layer of material includes depositing a predominantly metal powder on the metal substrate during each pass through a powder bed that includes the predominantly metal powder, and wherein the powder bed is part of the material source system. In some embodiments, the deposition of the layer of material includes feeding a feeder wire to the wire substrate and heating the feeder wire and/or the wire substrate so that the feeder wire solidifies with the wire substrate. In some embodiments, the deposition of the layer of material includes depositing different materials or compositions in a repeated pattern in a length-wise direction of the wire substrate.

Some embodiments provide a system for manufacturing a wire or a welding-type filler metal wire. The system can include, for example, a transporter system configured to move a work-in-progress filler metal build under a heat source; a material source system configured to provide a source material that is added to a substrate or a previously bonded material by the heat source over one or more passes to build a near-net shaped solid wire; and a plate assembly or a die assembly configured to draw down to ensure a diameter or a cross-sectional area of the near-net shape solid wire into a finished solid wire.

Some embodiments provide a system for manufacturing a wire or a welding-type filler metal wire. The system can include, for example, an LMD head or an electric arc torch or an electron beam that is configured to heat a metal substrate and to deposit a material onto the heated metal substrate to additively manufacture a near-net shaped wire; a transportation system configured to move the metal substrate under the LMD head or the electric arc torch or the electron beam; and a plate assembly or a die assembly configured to draw down a diameter of the near-net shape wire into a finished wire.

Some embodiments provide a system for manufacturing a wire or a welding-type filler metal wire. The system can include, for example, a transporter system configured to move a metal substrate under a heat source; a material source system configured to provide a metal oxide, a carbide, a silica, or a flux or a high temperature nanoparticle that is bonded to the metal substrate by the heat source over one or more passes to progressively increase a cross-sectional area of a near-net shaped solid wire; and a plate assembly or a die assembly configured to allow a skin pass of the near-net shape solid wire into a finished solid wire. In some embodiments, the material source system can provide a two or more of the following: a metal material, a metal oxide, a carbide, a silica, a flux, high temperature nanoparticles, and other non-metallic materials. The plate assembly or the die assembly can reduce diameter of the near-net shape solid wire by less than ten percent. In some embodiments, the plate assembly or the die assembly might not substantially reduce the diameter of the near-net shape solid wire when forming the finished solid wire.

Some embodiments provide a system for manufacturing a wire or a welding-type filler metal wire. The system can include, for example, a transporter system and a plate assembly or die assembly. The transporter system can be configured to move a wire-in-progress (WIP) wire under a heat source. The heat source can be configured to modify a surface property or a geometry of the WIP wire. The plate assembly or the die assembly can be configured to draw down a diameter of the WIP wire into a finished solid wire. The heat source can include, for example, a high energy density beam heat source or a laser. The heat source can be configured to provide surface marking or texturing on the WIP wire; provide micro hole drilling or micromachining to create cavities in the WIP wire; and/or introduce residual stress in particular patterns in the WIP wire.

Some embodiments provide an integrally built or formed wire, ribbon, or strip. One or more embodiments can include one or more of the following: an interior portion that is configured to be porous or to have one or more cavities; an interior portion that configured to provide geometrical patterns of discontinuity; an interior portion that is configured to provide, axially or cross-sectionally, a chemical or compositional variation pattern; an exterior portion that is configured to provide cavities; an exterior portion that is configured with surface textures or nanostructures other than smooth; the wire, the ribbon, or the strip that is configured to provide compression or tension residual stress patterns; the wire, the ribbon, or the strip that is configured to provide stiffness patterns; the wire, the ribbon, or the strip that is configured to provide elastic and plastic deformation patterns; and the wire, the ribbon, or the strip that is configured to provide lengthwise variation of a cross-sectional area with a pattern for a non-contact or magnetic sensing of the wire feed rate or codes for a wire type and a size. In some embodiments, the wire, ribbon, or strip does not have powder constituents, or wherein the wire, ribbon, or strip is not built-up by mechanical layering or swaging. In some embodiments, the wire, ribbon, or strip is made using additive manufacturing or three-dimensional (3D) printing. In some embodiments, one or more properties of the wire, ribbon, or strip is achieved by a high energy density beam as a heat source. In some embodiments, the wire, ribbon, or strip is configured as filler metal for welding, joining, cladding, soldering, or brazing.

Some embodiments provide a method for manufacturing a wire or a welding-type filler metal wire. The method can include one or more of the following: depositing a powder, a wire, or a strip as a raw material; heating the raw material with a high energy density beam; and fusing the raw material into a WIP wire. In some embodiments, the high energy density beam includes one or more of the following: a laser beam, an electron beam, and a plasma arc. In some embodiments, the high energy density beam is used to fuse the exterior seam of the wire. In some embodiments, the interior of the solid wire is integrally bonded together and does not include a loose powder.

While the present methods, processes, and systems have been described with reference to certain implementations, it will be understood by those skilled in the art that various changes may be made and equivalents may be substituted without departing from the scope of the present methods, processes, and systems. In addition, many modifications may be made to adapt a particular situation or material to the teachings of the present disclosure without departing from its scope. Therefore, it is intended that the present methods, processes, and systems not be limited to the particular implementations disclosed, but that the present methods, processes, and systems will include all implementations falling within the scope of the appended claims.

What are claimed:

1. A system for manufacturing a welding-type filler metal wire, comprising:
    a transporter system configured to move a work-in-progress filler metal build under a heat source;
    a material source system that provides a source material that is added to a substrate or a previously bonded material by the heat source over one or more passes, wherein one or both of the transporter system and the material system build a near-net shaped solid wire; and
    a plate assembly or a die assembly that draws down to ensure a diameter or a cross-sectional area of the near-net shape solid wire into a finished solid wire,
    wherein the heat source is configured to fuse the source material as a layer onto the substrate with a spot size commensurate with the width of the layer.

2. The system according to claim 1, wherein the plate assembly or the die assembly is configured to reduce the diameter of the near-net shape solid wire by less than ten percent.

3. The system according to claim 1, wherein the substrate or the previously bonded material includes a metal strip.

4. The system according to claim 1, wherein the substrate or the previously bonded material includes a powder, a flux, a wire, or a rod.

5. The system according to claim 1, wherein the transporter system includes one or more pulleys that move the substrate or the previously bonded material.

6. The system according to claim 1, wherein the transporter system includes one or more motorized drive rolls.

7. The system according to claim 1, wherein the heat source includes one or more of the following: a laser source, an induction heating source, an electron beam source, and an arc.

8. The system according to claim 1, wherein the finished solid wire is consumed in an electric arc or high energy density beam for one or more of welding, brazing, cladding, cutting, or gouging.

9. The system according to claim 1, wherein the transporter system is configured to continuously or periodically move the substrate or the previously bonded material.

10. The system according to claim 1, wherein the material source system includes a powder bed, wherein the transporter system is configured to move the substrate or the previously bonded material multiple times through the powder bed, and wherein each time through the powder bed causes a deposition of a layer of material in powder form on the substrate or the previously bonded material.

11. The system according to claim 1, wherein the heat source is configured to sinter or melt the deposited layer of metal and a non-metallic material onto the substrate or the previously bonded material.

12. The system according to claim 1, wherein the material source system includes a wire feeding system configured to provide a feeder wire to the substrate or the previously bonded material such that the feeder wire melts and solidifies with the substrate or the previously bonded material.

13. The system according to claim 1, wherein the near-net shaped wire has a porous internal structure and an external surface.

14. The system according to claim 1, wherein the near-net shaped wire has a hermetically sealed exterior.

15. The system according to claim 1, wherein the near-net shaped wire has different compositions or constitution that repeat in a length-wise direction of the near-net shaped wire.

16. The system according to claim 1, wherein the near-net shaped wire has different physical properties that repeat in a length-wise direction of the near-net shaped wire.

17. The system according to claim 1, wherein the near-net shaped wire has different physical structures that repeat in a length-wise direction of the near-net shaped wire.

18. The system according to claim 1, wherein the substrate or the previously bonded material is initially a C-shaped, U-shaped, or flat metal strip.

19. The system according to claim 1, wherein the source material includes metal or metal oxide powders including or more of the following: iron, niobium, vanadium, zirconium, titanium, molybdenum, boron, rare-earth metals, aluminum, nickel, magnesium, manganese, and chromium.

20. The system according to claim 1, wherein the source material includes a non-metallic material that includes one or more of the following: an arc stabilizer and a shielding agent.

21. The system according to claim 20, wherein the arc stabilizer includes one or both of potassium and sodium, or wherein the shielding agent includes one or both of lime stone and ferrosilicon.

22. The system according to claim 1, wherein the welding-type filler metal wire is configured to be used for welding, joining, brazing, soldering, or cladding with an arc, a laser, an electron beam, or friction as an energy source.

23. The system according to claim 1,
wherein the material source system includes a laser metal deposition (LMD) head or an electron beam or an electric arc torch, and is configured to deposit the source material and to heat the deposited material to additively manufacture a near-net shaped wire in an axial direction of the near-net shaped wire, and
wherein the transportation system is configured to axially move the wire away from the LMD head or the electron beam or the electric arc torch, wherein the LMD head or the electron beam or the electric arc torch and the transportation system are matched in speed.

24. The system according to claim 23, wherein the drawing plate assembly or the drawing die assembly is configured to reduce the diameter of the near-net shape solid wire by less than ten percent by.

25. The system according to claim 23, wherein the LMD head coaxially provides a laser beam, the source material, and a shielding gas.

26. The system according to claim 23, wherein the LMD head is configured to build up the near-net shaped wire axially.

27. The system according to claim 1,
wherein the material source system includes a laser metal deposition (LMD) head or an electron beam or an electric arc torch configured to heat the substrate or the previously bonded material and to deposit the source material onto the heated metal substrate or the heated previously bonded material to additively manufacture a near-net shaped wire, and
wherein the transportation system is configured to move the substrate or the previously bonded material under the LMD head or the electric arc torch or the electron beam.

28. The system according to claim 1, wherein the heat source is configured to modify a surface property or a geometry of the work-in-progress filler metal build.

29. The system according to claim 28, wherein the heat source is configured to surface mark or texture the work-in-progress filler metal build.

30. The system according to claim 28, wherein the heat source is configured to micro hole drill or micromachine to create cavities in the work-in-progress filler metal build.

31. The system according to claim 28, wherein the heat source is configured to introduce residual stress in particular patterns in the work-in-progress filler metal build.

32. The system according to claim 1, wherein the material source system is configured to provide a metal oxide, a carbide, a silica, a flux, or a high temperature nanoparticle to the substrate, and wherein the heat source is configured to bond the metal oxide, a carbide, a silica, a flux, or a high temperature nanoparticle to the substrate over one or more passes to build the near-net shaped solid wire.

33. The system according to claim 32, wherein the material source system is configured to provide a metal material and one or more of the following: the metal oxide, the carbide, the silica, the flux, high temperature nanoparticles, and other non-metallic material.

34. The system according to claim 33, wherein the plate assembly or the die assembly is configured to not substantially reduce the diameter of the near-net shape solid wire when forming the finished solid wire.

35. A system for manufacturing a welding-type filler metal wire, comprising:
a transporter system that moves a work-in-progress filler metal build under a heat source;
a material source system that provides a source material that is added to a substrate or a previously bonded material by the heat source over one or more passes, wherein one or both of the transporter system and the material system build a near-net shaped solid wire; and
a plate assembly or a die assembly that draws down to ensure a diameter or a cross-sectional area of the near-net shape solid wire into a finished solid wire,
wherein the heat source is configured to create cavities in the work-in-progress filler metal build by micro hole drilling or micromachining.

* * * * *